Aug. 2, 1955  A. GAZDA  2,714,283
CLOCK WOUND BY THE STEERING WHEEL
Filed July 26, 1950  3 Sheets-Sheet 1

INVENTOR
A. Gazda
BY Wenderoth, Lind & Ponack
ATTORNEYS

Aug. 2, 1955  A. GAZDA  2,714,283
CLOCK WOUND BY THE STEERING WHEEL
Filed July 26, 1950  3 Sheets-Sheet 3
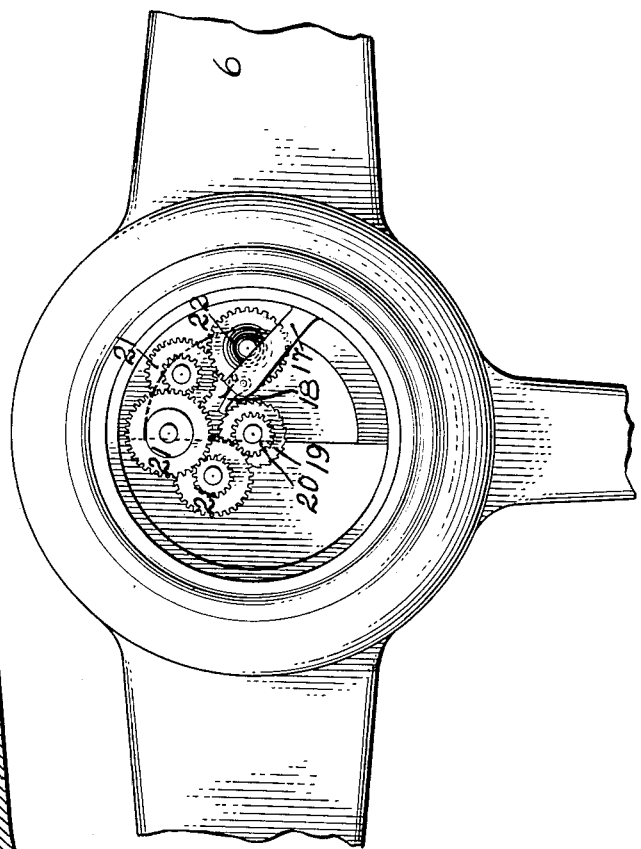
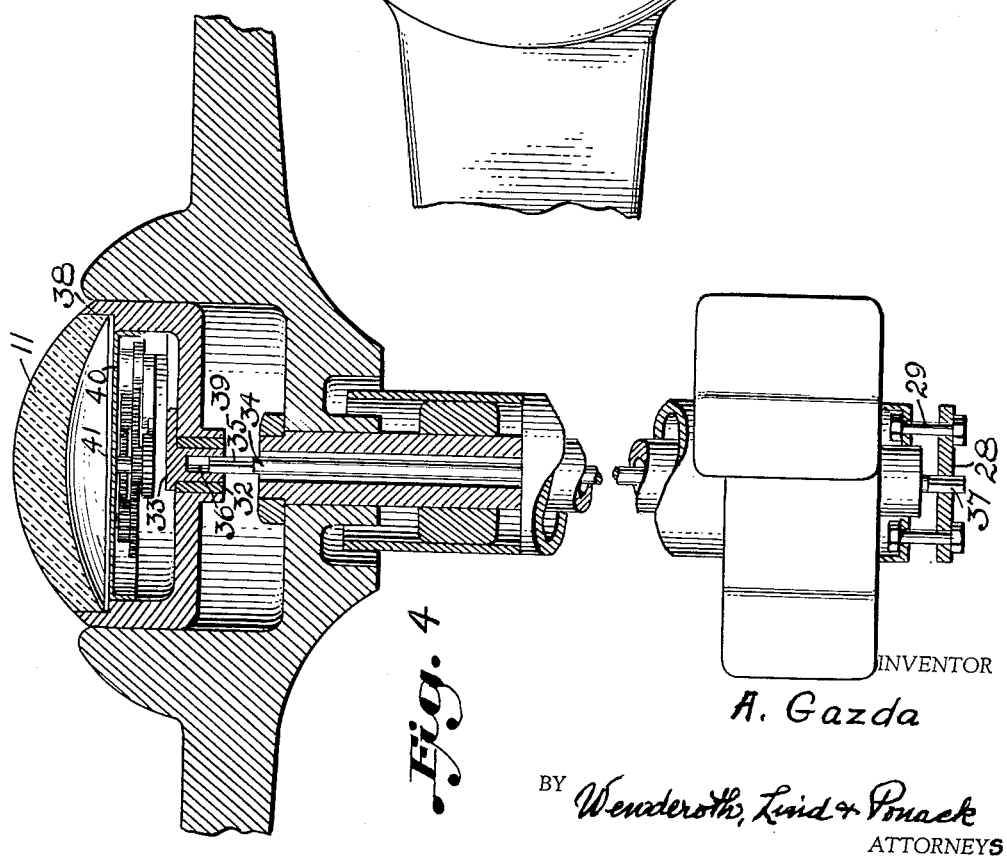
INVENTOR
A. Gazda
BY Wenderoth, Lind & Ponack
ATTORNEYS

United States Patent Office 2,714,283
Patented Aug. 2, 1955

2,714,283

CLOCK WOUND BY THE STEERING WHEEL

Antoine Gazda, Providence, R. I.

Application July 26, 1950, Serial No. 175,956

2 Claims. (Cl. 58—46)

This invention relates to a clock mounted upon the steering wheel of an automobile and the like which is wound by the operator when moving the steering wheel.

An object of the invention is to construct a clock provided with a mainspring which is reliable in operation and wherein the main spring is wound by the operator when steering the vehicle.

A further object of the invention is to provide a casing for a time mechanism which is held fixed in position upon the steering wheel while means are provided which are fixed with relation to the movements of the wheel for winding the mainspring.

A still further object of the invention is to provide a casing for a clock fixed to the steering wheel with resilient means for actuating the mainspring in order to wind it when the steering wheel with clock attached is rotated.

With the above and other objects in view which will become apparent from the detailed description and claims set forth below the invention is shown in the drawings in which:

Fig. 4 is a cross-sectional view similar to Fig. 2 of a modified construction; and Fig. 5 is a plan view of the mainspring winding means.

In the various views similar reference characters indicate like parts.

The clock mechanism for actuating the hands of the clock with the exception of the main spring and cooperating gears is not shown upon the drawings because such is not necessary for an understanding of the invention. Any standard time mechanism may be used.

The usual steering wheel of an automobile is shown at 5 with spokes 6. The clock as a whole is indicated at 7 as being mounted at the hub of the steering wheel. The clock 7 may, however, be mounted upon any of the spokes of the wheel with equal facility requiring only slight modifications of the structures described below.

Figure 2:
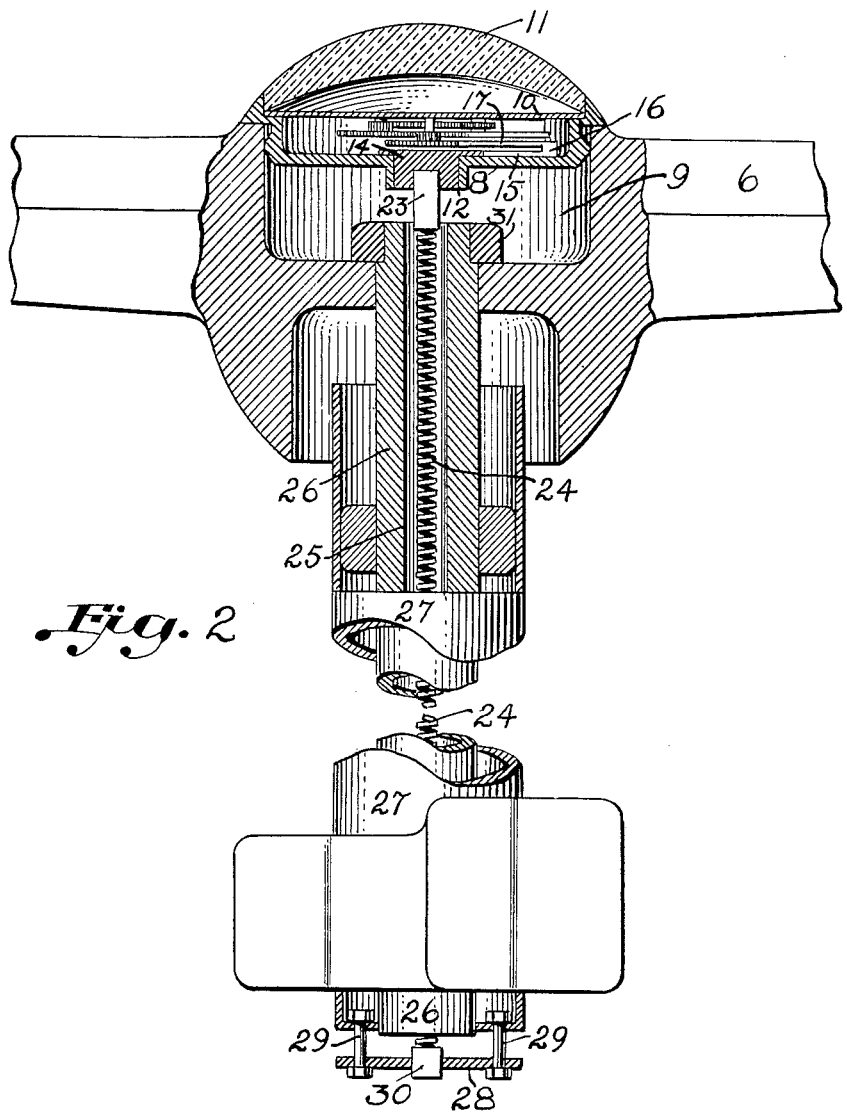
Fig. 2 is a cross-sectional view with parts shown in elevation taken through the center of the clock shown in Fig. 1 with the time mechanism omitted for greater clarity and illustrating the means for winding the mainspring of the time mechanism.

Referring to Fig. 2 the clock casing is shown at 8 and such casing is fixed in a recess 9 provided in the hub of the steering wheel 5. The casing 8 may if desired be screw threaded to the walls of the recess 9. The face of the clock is indicated at 10 and over the face is a magnifying lens 11 which is secured to the casing 8 and may be used as indicated to retain the face 10 in position.

The casing 8 in its bottom walls is provided with a central circular recess 12 in which is positioned a plug 14 of metal or a self lubricating material. The plug 14 is provided with an arm 15 which may be integral therewith and the arm 15 has an upward extension 16 with a centrally directed extension 17 as shown more particularly in Fig. 5. Mounted upon the inner end of the extension 17 is a spring pressed pawl 18 which cooperates with a ratchet wheel 19 fixed to a spur gear 20 which in turn actuates the gear train 21 which winds the mainspring 22 of the clock. The mainspring 22 is provided with means to prevent overwind such as shown for instance in U. S. Patent 211,280. Any type of overwind mechanism may, however, be used.

Fixed to the plug 14 is a block 23 which is in turn connected to one end of a coil spring 24 which extends downwardly through a bore 25 provided in the center of the steering rod 26. The steering column is shown at 27 and at the lower end thereof a cross plate 28 is secured thereto by the bolts 29. The lower end of the coil spring 24 is connected to a block 30 which is in turn secured to the plate 28.

The steering rod 26 is secured to the steering wheel by the nut 31.

The operation of the modification described above is as follows. When the operator of the vehicle moves the steering wheel the clock casing 8 is carried therewith. However, due to the fixing of the plug 14 to the block 23 and the spring 24 which is maintained stationary there is a relative movement between the clock casing 8 and the arm 17 carrying the pawl 18. If the steering wheel is moved by the operator in clockwise direction to make a right hand turn then the ratchet wheel 19 is rotated therewith and the teeth thereof will slip over the spring pressed pawl 18. However, upon the return movement of the steering wheel 5 as it moves counterclockwise the pawl 18 will restrain the ratchet wheel 19 and thereby actuate the train of gears 21 so as to wind the main spring 22. Obviously the teeth upon the ratchet wheel may be reversed so that winding of the main spring will take place upon the clockwise movement of the steering wheel.

The coil spring 24 is designed also to prevent any damage in case there should be any binding of the parts.

Figure 1:
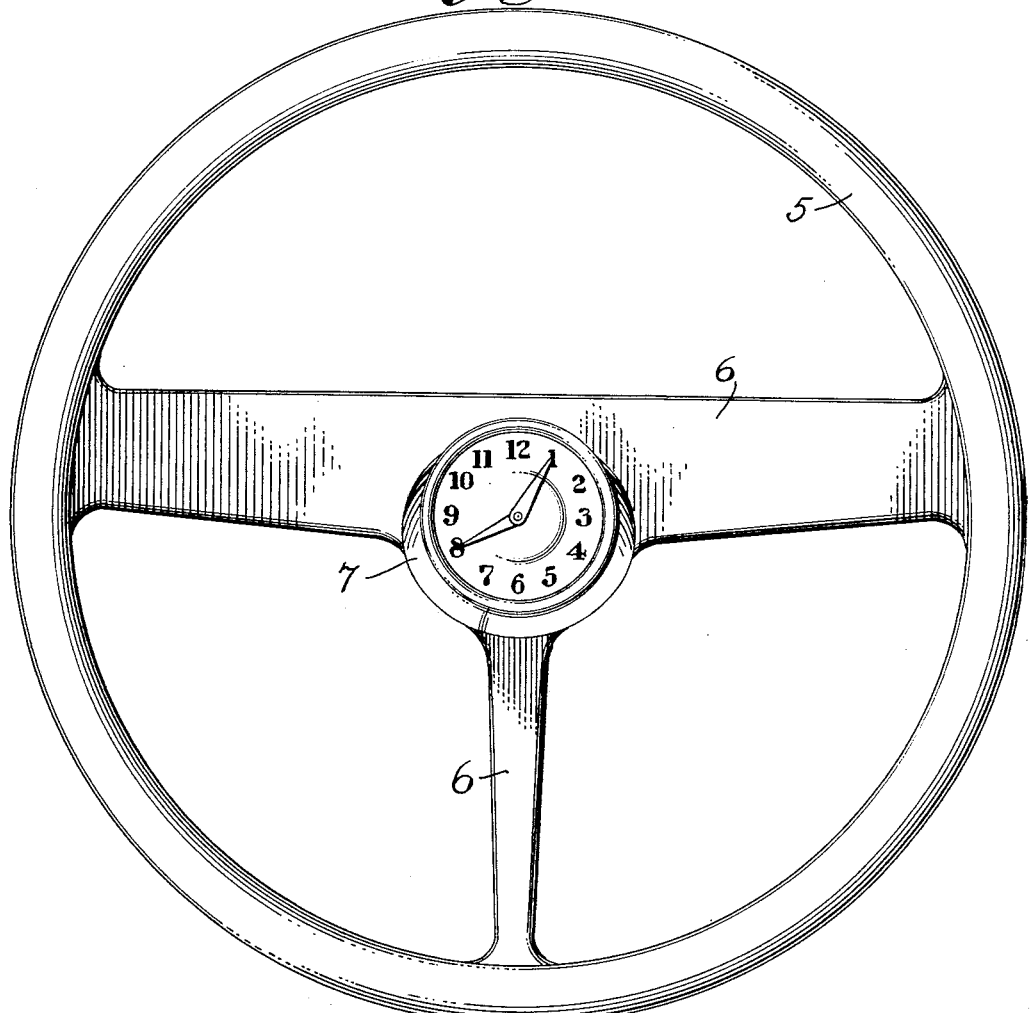
Fig. 1 is a plan view of a steering wheel showing the clock mounted thereon.
Figure 3:
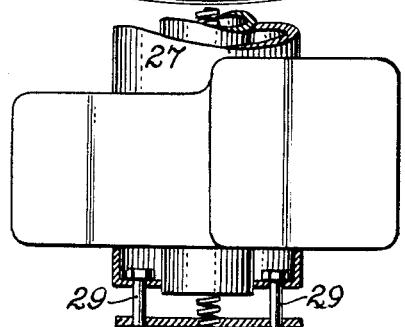
Fig. 3 is an elevational view with parts in cross-section showing a modified construction for fixing the clock casing with reference to the steering wheel.

In Fig. 3 a slight modification is shown wherein the coil spring 24 instead of being secured to a block 30 upon the plate 28 is secured instead to an angular lug 31 secured by one of the bolts 29 to the plate 28. In all other respects this modification is the same as that shown in Fig. 2.

In Fig. 4 another modification is shown which is similar to the modification shown in Fig. 2 with the exception that a bushing 32 which may be self lubricating is inserted between the plug 33 which corresponds to the plug 14 and a rod 34 is provided instead of the spring 24. The rod 34 is provided with a squared end 35 which fits into a square recess 36 provided in the plug 33 and at the lower end the rod 34 is provided with a squared end 37 which fits into a square recess provided in the plate 28.

In this modification the casing 38 is of somewhat different shape fitting entirely into the recess 39 provided in the wheel hub. A cooperating cover 40 carrying the time mechanism and the means for winding the main spring is telescoped within the casing 38. The face of the clock is shown at 41. The operating mechanism for winding the main spring of the clock shown in Fig. 4 is identical with that shown with respect to the other modications and shown particularly in Fig. 5.

The connection between the plug 33 and the bushing 32 in Fig. 4 as well as between the plug 14 and the casing 8 in Fig. 2 must be dust tight. The rod 34 in the modification shown in Fig. 4 will operate to actuate the ratchet 19 in the manner previously described.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A clock having a time mechanism for an automobile or the like having a steering wheel comprising a casing fixed to said steering wheel, a mainspring for said time mechanism, a ratchet wheel, a train of gears between said ratchet wheel and said mainspring, said mainspring, gears and ratchet wheel being movable with said casing and steering wheel, a circular plug extending through said casing, a steering rod connected to said steering wheel having a central bore, a spring connected to said plug and extending through said bore, said spring being connected to a fixed part of the automobile and a spring actuated pawl connected to said plug for operating said ratchet wheel to wind said main spring upon movements of said steering wheel.

2. A clock having a time mechanism for an automobile or the like having a steering wheel comprising a casing fixed to said steering wheel, a mainspring for said time mechanism, a ratchet wheel, a train of gears between said ratchet wheel and said mainspring, said mainspring, gears and ratchet wheel being movable with said casing and steering wheel, a fixed plug extending through said casing, a spring connected to a fixed portion of said automobile and said plug and a pawl connected to said plug cooperating with said ratchet wheel to wind said mainspring upon movements of said steering wheel.

References Cited in the file of this patent

UNITED STATES PATENTS

| | | |
|---|---|---|
| 1,536,850 | Hennessey | May 5, 1925 |
| 1,935,760 | Amburgey | Nov. 21, 1933 |
| 1,946,890 | Whitehead | Feb. 13, 1934 |